United States Patent Office 3,538,030
Patented Nov. 3, 1970

3,538,030
VINYLIDENE CHLORIDE COPOLYMER COATED
ORGANIC POLYMERIC FILM
James Thomas Chamness, Richmond, Va., assignor to
E. I. du Pont de Nemours and Company, Wilmington,
Del., a corporation of Delaware
No Drawing. Filed Feb. 2, 1968, Ser. No. 703,236
Int. Cl. C08f 45/00
U.S. Cl. 260—23
9 Claims

ABSTRACT OF THE DISCLOSURE

A heat-sealable coating composition for organic polymeric film, e.g. regenerated cellulose film, comprising as the essential ingredients in a volatile organic solvent (1) 100 parts by weight of a copolymer of vinylidene chloride and at least one other ethylenically unsaturated monomer copolymerizable therewith said copolymer containing at least 87% by weight of vinylidene chloride; (2) from 2 to 4 parts by weight of a naturally occurring ester wax having a melting point of at least 75° C. and a hardness value of at least 0.25 kg./mm.$^2$ at 60° C.; (3) from 0.5 to 3 parts by weight of sodium stearate; and (4) from 0.2 to 1.0 part by weight of a solid particulate material having a particle size in the range of 0.5 to 10 microns.

---

Large quantities of organic polymer films such as regenerated cellulose film carrying heat-sealable vinylidene chloride copolymer coatings are used to wrap articles of commerce in automatic packaging machinery. Such machines are many in type, and employ various types of sealing means. In general, the surfaces of the sealing bars are either smooth and flat or are serrated or crimped. Coating formulations having enhanced release properties have been devised to insure that the heat sealed film will release immediately from the sealing bars regardless of the configuration thereof since even a momentary sticking of film to the bar after the sealing pressure is released will result in the jamming of a continuous high speed package forming machine. It is found, however, that none of these coating formulations lends itself well as a coating for a film which is to be used for making bags wherein a flat sealing bar is used at the bottom seam of the bag and a flat seam is used as the side seam. Invariably when the side seal is made at a temperature high enough to effect a firm bond between the overlapping layers, the tendency is for the sealed area to adhere even though lightly to the opposite inner wall of the formed bag, causing difficulty in subsequent opening of the bag. For descriptive purposes this is termed "interfacial sticking." It is required for most efficient operation in a wide variety of packaging and package forming machines that there bt a so-called stick free range of at least 60° F. in which range the films can be sealed adequately without sticking to the opposite wall of the bag.

Accordingly, it is a principal object of this invention to provide a coating formulation which can be applied on regenerated cellulose film and like base layers of organic polymeric film to give coated films which have good release properties when used on crimp sealing machines and which will be free of interfacial sticking of the seamed areas to the opposite inner walls of the bags formed with a flat sealing bar.

The foregoing and kindred objects are realized by this invention which, briefly stated resides in a heat-sealable coating composition for an organic polymer film, e.g. a regenerated cellulose film, comprising essentially a solution in a volatile organic solvent of (1) 100 parts by weight of a copolymer of vinylidene chloride and at least one other ethylenically unsaturated monomer copolymerizable therewith the copolymer containing at least 87% by weight of vinylidene chloride; (2) from 2 to 4 parts by weight of a naturally occurring ester wax having a melting point of at least 75° C. and a hardness value of at least 0.25 kg./mm.$^2$ at 60° C.; (3) from 0.5 to 3 parts by weight of sodium stearate; and (4) from 0.2 to 1.0 part by weight of a solid particulate having a particle size in the range of 0.5 to 10 microns.

The vinylidene chloride copolymers suitable for purposes of this invention are those set forth in U.S. patent application Ser. No. 397,608, filed Sept. 18, 1964, now U.S. Pat. No. 3,375,215.

The coating solutions are made up following essentially the normal procedures with solids content of the coating solution being in the order of 10 to 25%, all as shown and particularly described in the aforesaid U.S. application Ser. No. 397,608.

The preferred naturally occurring ester wax is carnauba. However other naturally occurring waxes may be used provided that melting point thereof is at least 75° C., and the hardness is at least 0.25 kg./mm.$^2$ at 60° C. The wax should have a sufficiently low compatibility with the vinylidene chloride copolymer that it will exude to the surface of the coating. Specific examples of suitable waxes, in addition to carnauba are Ourichury and Raffia wax.

The particulate material serves the purpose of improving the antiblocking properties of the film and improves the film-to-film slip. The particulate used should be insoluble in the coating and in the coating solvents. Suitable materials include, for example, talc in amounts between 0.2 and 1.0 part bentonite clay in amounts between 0.05 and 0.2, mica in amounts between 0.5 and 2.0 parts by weight in all cases based on 100 parts by weight of vinylidene chloride copolymer. Below the respective lower limits the slip of the film is inadequate while above the upper limits the film becomes hazy. A preferred particulate material is steatite talc, in amounts between 0.3 and 0.5 part by weight.

The following example of a preferred embodiment will serve to further illustrate the principles and practice of my invention. Parts and percentages are by weight unless otherwise limited.

EXAMPLE

A coating bath is made by dissolving 100 parts of a 91.5/6/2/0.5 vinylidene chloride/acrylonitrile/methyl methacrylate/itaconic copolymer and 3 parts of carnauba wax (M.P. 86° C.; hardness—0.47 kg./mm.$^2$ at 60° C.— ASTM—D 1474—62T, Method B) in a mixture of 265 parts of tetrahydrofuran and 182 parts of toluene and stirring this solution with a slurry of one part of sodium stearate and 0.5 part of steatite talc for approximately 30 minutes at 40° C. This bath is coated on a regenerated cellulose base film containing about 15% of glycerol and 0.4% of a modified melamine-formaldehyde anchoring resin. The resulting film bears about 3 grams per square meter of coating.

Samples of the film are tested for interfacial sticking by making bags in a Simplex bag making machine. The machine speed is set to make 60 bags per minute and the temperature of the sealing bar is gradually raised. The temperature at which a seal is obtained is noted as the minimum seal temperature. The temperature of the bar when bags produced on the machine show sticking between the sealed area and the opposing wall of the bag is noted as the stick temperature. The range of temperature between the minimum seal temperature and the stick temperature is noted as the stick-free range. The film described above shows a minimum seal temperature of 220° F., a stick temperature of 320° F. and stick-free range of 100° F. A control film made with a coating of the same vinylidene chloride copolymer but where the additives comprise 5 parts candelilla wax, 0.5 part glyceryl ester of maleic anhydride treated rosin, 2 parts of calcium stearate and 0.5 part particulate show a stick-free range of about 50° F.

Both the test and control films perform well on a make and fill packaging machine having crimp sealing jaws, with no tendency for the films to stick to the jaws after the seal is made. The improved interfacial sticking performance which characterize the composition of the present invention is attained while retaining satisfactory adhesion of the coating, heat sealability, low water vapor premeability, antiblocking characteristics, appearance and general machine running performance.

Although the invention is described herein with specific reference to the coating of regenerated cellulose film, it is to be understood that the novel coating composition herein described is equally useful on other types of organic polymeric base sheet. Other suitable types of base sheet include films of methyl cellulose, ethyl cellulose, hydroxy ethyl cellulose, hydroxy propyl cellulose, polyvinyl alcohol, partially hydrolyzed ethylene/vinyl acetate copolymers, oriented and unoriented films of polyolefins such as polyethylene, polypropylene, and copolymers thereof with other mono- and diolefins and functionally substituted olefins, polyesters such as polyethylene terephthalate, polyamides such as hexamethylene adipate, polyvinyl chloride, and polystyrene. The coating composition is also useful for coating laminated structures containing two or more sheets of regenerated cellulose, and structures containing one or more layers of cellulose laminated in combination with other types of sheets, pellicles and foils.

What is claimed is:
1. A heat-sealable coating composition for organic polymeric film comprising essentially a volatile organic solvent solution of (1) 100 parts by weight of a copolymer of vinylidene chloride and at least one other ethylenically unsaturated monomer copolymerizable therewith, said copolymer containing at least 87% by weight of vinylidene chloride; (2) from 2 to 4 parts by weight of a naturally occurring ester wax having a melting point of at least 75° C. and a hardness value of at least 0.25 kg./mm.$^2$ at 60° C.; (3) from 0.5 to 3 parts by weight of sodium stearate; and (4) from 0.5 to 1.0 part by weight of a solid particulate material having a particle size in the range of 0.5 to 10 microns.

2. The composition of claim 1 wherein the ester wax is carnauba wax.

3. The composition of claim 1 wherein the particulate material is steatite talc.

4. The composition of claim 1 wherein the copolymer is vinylidene chloride/acrylonitrile/methyl methacrylate itaconic acid in the weight ratio of 91.5/6/2/0.5.

5. The process of claim 4 wherein the ester wax is carnauba wax, and the particulate material is steatite talc.

6. An organic polymer film having on at least one surface a continuous adherent coating comprising essentially a volatile organic solvent solution of (1) 100 parts by weight of a copolymer of vinylidene chloride and at least one other ethylenically unsaturated monomer copolymerizable therewith, said copolymer containing at least 87% by weight of vinylidene chloride; (2) from 2 to 4 parts by weight of a naturally occurring ester wax having a melting point of at least 75° C. and a hardness value of at least 0.25 kg./mm.$^2$ at 60° C.; (3) from 0.5 to 3 parts by weight of sodium stearate; and (4) from 0.5 to 1.0 part by weight of a solid particulate material having a particle size in the range of 0.5 to 10 microns.

7. The coated film of claim 6 wherein the organic polymeric film is regenerated cellulose film.

8. The coated film of claim 7 wherein the ester wax is carnauba wax and the particulate material is steatite talc.

9. The process of claim 8 wherein the copolymer is vinylidene chloride/acrylonitrile/methyl methacrylate/itaconic acid in the weight ratio of 91.5/6/2/0.5.

References Cited
UNITED STATES PATENTS

| | | | |
|---|---|---|---|
| 2,525,671 | 10/1950 | Hauser | 260—23 XR |
| 3,375,215 | 3/1968 | Kane | 260—23 |
| 3,419,421 | 12/1968 | Eastes | 260—23 XR |

DONALD E. CZAJA, Primary Examiner

D. J. BARRACK, Assistant Examiner

U.S. Cl. X.R.

117—138.8, 145, 161; 260—27, 28.5, 30.4, 33.6